No. 681,312. Patented Aug. 27, 1901.
J. H. GROZIER.
COMBINED PIPE COLLAR AND FLANGE.
(Application filed Mar. 6, 1901.)
(No Model.)
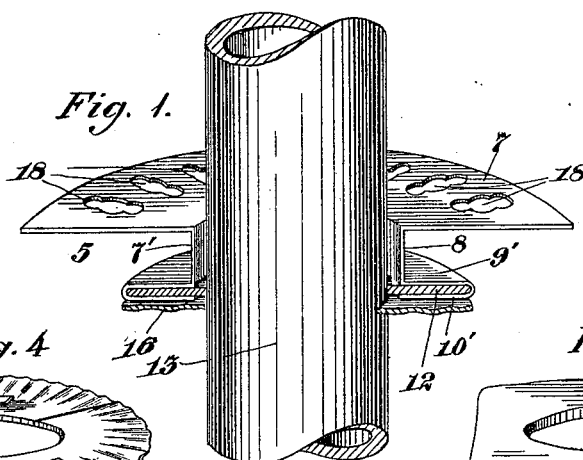
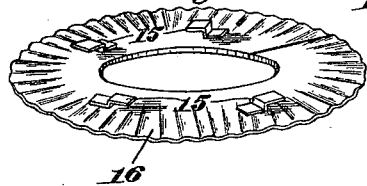
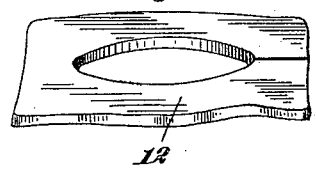
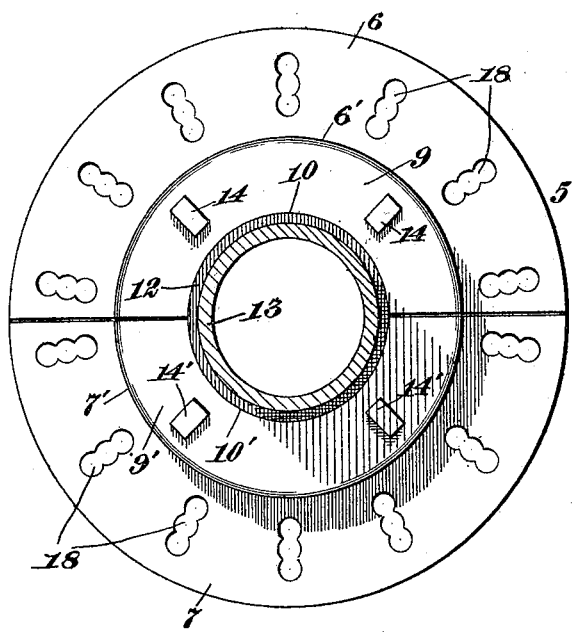
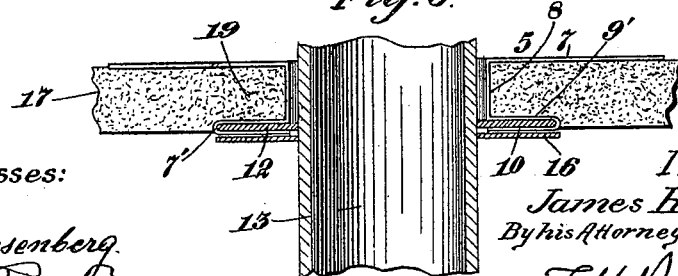
Witnesses:
Ig. Rosenberg
F. N. Harland
Inventor:
James H. Grozier
By his Attorney:
F. H. Richards

UNITED STATES PATENT OFFICE.

JAMES H. GROZIER, OF HARTFORD, CONNECTICUT.

COMBINED PIPE COLLAR AND FLANGE.

SPECIFICATION forming part of Letters Patent No. 681,312, dated August 27, 1901.

Application filed March 6, 1901. Serial No. 50,026. (No model.)

*To all whom it may concern:*

Be it known that I, JAMES H. GROZIER, a citizen of the United States, residing in Hartford, in the county of Hartford and State of Connecticut, have invented certain new and useful Improvements in a Combined Pipe Collar and Flange, of which the following is a specification.

This invention relates to a combined pipe collar and flange to be attached to ceiling-joists or other supports in the walls of a room through which it is desired to pass a pipe or flue.

Heretofore in the kinds of these devices with which I am familiar means have not been provided for sustaining the plaster on the wall or ceiling, and the consequence has been that such plaster has been loosened or broken when the pipe or flange is passed through the thimble on its way to the chimney or other outlet. My invention is designed to overcome this difficulty; and it has for one object the provision of a pipe collar and flange of such construction that the plaster will be fully sustained and there will be no danger of injury to the same.

A further object of the invention is the provision of a sectional pipe collar and flange which may be readily attached to the support through which the pipe passes.

A further object of the invention is the provision of a pipe collar or flange having a broad upper surface or plate to be attached to the support, a thimble depending from said plate, and a short flange located, preferably, at right angles to the thimble, the construction being such that a recess or pocket is provided for the reception of the plaster, as will be hereinafter explained.

A further object of the invention is the provision of a pipe collar or flange having at one end a plate of any desired configuration and at its other end a flange of less dimensions than the plate, said flange being provided with an inturned lip for the reception of a washer or gasket through which the pipe passes.

A further object of the invention is the provision on the end surfaces of the pipe collar or flange of an ornamental plate provided with means whereby it may be removably secured in place.

In the accompanying drawings, in which like numerals designate similar parts throughout the several views, Figure 1 is a perspective representation of one-half of my improved pipe collar and flange, the washer and ornamental plate being represented in section. Fig. 2 is a transverse section of the thimble connecting the plate and lower flange of my device, the said plate being represented in plan from the under side. Fig. 3 is a longitudinal vertical section of my invention, illustrating the plaster sustained in position within the recess or pocket of the same. Fig. 4 is a perspective view of an ornamental plate and lugs thereon. Fig. 5 is a perspective view of the washer or gasket.

Referring to the drawings, designated in a general way by the numeral 5 is my improved pipe collar and flange, which in the illustration given is composed of plates 6 and 7, from each of which depends a section 6' 7', respectively, of a thimble 8. Projecting laterally from the sections of this thimble are flanges 9 9', of less diameter than the plates 6 and 7, each of said flanges having an inturned lip 10 10' to form a seat or pocket for the reception of a perforated washer 12, through which the pipe 13 passes with a tight fit, as represented in Figs. 1 and 3, whereby the expansion or contraction of the pipe is compensated for by the yielding washer without loosening the fixture or damaging the plaster. On their under surfaces the inturned lips 10 10' are provided with loops 14 14' for the reception of lugs 15 on an ornamental ceiling or wall plate 16, the construction being such that the lugs 15 may be inserted in the loops 14 14' and the plate then turned to unite the parts in a manner analogous to that of a "bayonet-joint."

In the sectional view, Fig. 3, plaster 17 is illustrated in a groove 19, formed between the upper plate and the lower flange of my device, and it will be seen that this plaster will be firmly secured in position without danger of displacement when the pipe or flue 13 is inserted.

In the use of my invention the plates 6 and 7 are first secured to the ceiling-joists or other support, and in this connection it will be noted that each of these plates is provided with a series of slots or openings 18, preferably of irregular contour, for the reception of the plaster when it is placed in position. After the plates, together with the thimble 8 and the flanges 9 9', with inturned lips 10 10', have been secured in position (said parts carrying the washer 12, as above stated) the plastering is applied between the parts and entering the groove 19 is firmly held in position, as illustrated in Fig. 3, and the ornamental or finishing plate 16 is then secured to the bottom surface of the inturned flange in the manner stated.

Changes may be made in the form and other details of the device without departure from the invention, and although the sections of the device are shown as of semicircular form it is distinctly to be understood that this is an immaterial consideration, for the shape of said sections may be changed as circumstances may require without departure from the scope thereof. So, too, the invention is not limited to a sectional device, nor to the precise way described in which the ornamental or finishing plate is secured in position.

Having thus described my invention, what I claim is—

1. A pipe collar and flange having a plate adapted to be secured to a support; a thimble projecting from the under side of said plate; and a flange projecting from the thimble beneath the plate, whereby a groove is formed between the flange and plate for the reception of plaster.

2. A pipe collar and flange consisting of a plate adapted to be secured to a support, and a flange of less dimensions than the plate and so supported at a distance therefrom and parallel thereto that a groove for the reception of plaster will be formed between said flange and the side of the plate.

3. A device for receiving pipes composed of top plates each having a section of a thimble, and, projecting from each thimble-section, a flange of less diameter than the top plates, each of said flanges being parallel with the top plate, whereby a groove is formed between the flanges and the under side of the plate for the reception of plaster.

4. A device for receiving pipes composed of a top plate, a flange of less diameter than said top plate and parallel thereto, whereby a groove is formed between the flange and under side of the plate for the reception of plaster, and a thimble uniting said plate and flange.

5. A pipe collar and flange comprising a top plate adapted to be secured to a support; a thimble depending from the top plate; a flange laterally projecting from the thimble and having an inturned portion; and a washer located between the flange and said inturned portion.

6. A sectional device for receiving pipes having semithimble-shaped portions and, projecting from said thimble-shaped portions, lateral flanges having, when the sections are placed in position, a seat for a washer through which the pipe passes.

7. A device for receiving pipes comprising plates and flanges each united by a section of a thimble; a washer through which the pipe passes secured to the flanges; and an ornamental plate provided with means whereby it may be attached to the flanges.

JAMES H. GROZIER.

Witnesses:
WM. H. BLODGETT,
HENRY BISSELL.